United States Patent [19]

Junk et al.

[11] Patent Number: 4,751,653

[45] Date of Patent: Jun. 14, 1988

[54] FAULT DETECTOR FOR A THREE-PHASE ALTERNATING CURRENT SUPPLY

[75] Inventors: Brian S. Junk, La Crosse; Robert E. Krocker, Stoddard; Tony J. Wood, West Salem, all of Wis.

[73] Assignee: American Standard Inc., New York, N.Y.

[21] Appl. No.: 900,043

[22] Filed: Aug. 25, 1986

[51] Int. Cl.⁴ .................... H02H 3/26; G01R 19/00; G01R 25/00
[52] U.S. Cl. .................................. 364/481; 364/483; 364/492; 361/76; 324/83 D
[58] Field of Search ...................... 361/24, 76, 89, 92, 361/93, 77; 364/481, 483, 492; 307/127, 132 EA; 324/83 R, 83 D, 86

[56] References Cited

U.S. PATENT DOCUMENTS

| 4,060,843 | 11/1977 | Bost | 361/76 |
| 4,461,986 | 7/1984 | Maynard et al. | 361/76 |
| 4,724,503 | 2/1988 | Libert | 361/77 |

OTHER PUBLICATIONS

Williams, K. R., "Primary Power Phase Monitor", IBM Disclosure Bulletin vol.19, No. 11, Apr. 1977.

*Primary Examiner*—Parshotam S. Lall
*Assistant Examiner*—Ellis B. Ramirez
*Attorney, Agent, or Firm*—William J. Beres; David L. Polsley; Robert J. Harter

[57] ABSTRACT

A microcomputer based fault detector for identifying a phase reversal, a phase loss, and a power loss in three-phase circuits. A microcomputer samples a pattern of timing signals generated in response to three current transformers associated with each of the three phases. The changing pattern of timing signals represent the phase relationship of each of the three phases. The sampling rate of the microcomputer is synchronized to the alternating current in each of the three phases by an interrupt signal indirectly generated by one of the phases. In the absence of current in this interrupt generating phase, a backup interrupt, internal to the microcomputer, is enabled which directs the microcomputer to determine if the absence of the first interrupt is due to a phase loss or a power loss. Either interrupt prompts the microcomputer to sample the pattern of signals and compare it to a predetermined pattern. By counting any deviant patterns and classifying them as characteristic of either a phase reversal, phase loss, or power loss, the microcomputer identifies the specific fault as the occurrence of a predetermined number of deviant patterns within a classification.

15 Claims, 4 Drawing Sheets

FAULT DETECTOR FOR A THREE-PHASE ALTERNATING CURRENT SUPPLY

TECHNICAL FIELD

This invention generally pertains to a microcomputer based fault detector for use with three-phase circuits and specifically to a fault detector that distinguishes among a phase reversal, a phase loss, and a power loss.

BACKGROUND OF THE INVENTION

Three-phase inductive motors, as well as many other three-phase loads, are often inoperable or susceptible to damage due to power supply faults such as power loss, phase loss, and phase reversal. More specifically, a momentary power loss allows a motor to decelerate which increases the degree of slip between the rotor and the alternating current passing through the stator. Upon restoration of power, the rotor tries to quickly recover its original slip relationship with the current. In the rotor's attempt to do so, high torques are developed which can damage the rotor shaft or other components associated with it.

In a phase loss, current is supplied to the motor through only two of the three supply lines. When this happens, the motor tries to compensate for the inactive phase by conducting additional current through the stator windings which are connected to the remaining two active phases. As a result of the additional current, the active windings can overheat to a destructively high temperature.

In reaction to a phase reversal, often referred to as reverse phase rotation, the motor rotates in a direction opposite its normal rotation. This is often caused by improperly matching the motor leads to the power supply. Depending on the specific application, reverse rotation can make a critical motor driven oil pump inoperative or unscrew an impeller from a threaded drive shaft, either of which can cause extensive damage.

Although a wide variety of fault detectors for use in three-phase circuits are presently available, many do not distinguish a phase reversal from other faults such as a phase or power loss. Moreover, in many applications, their timely response to faults is inadequate. Some detectors respond too slowly to critical faults such as a momentary power loss, where damage can quickly occur if the detector doesn't interrupt the power supply before power is restored. Other detectors respond too quickly to less critical faults where a slower response is desirable to reduce the effects of false readings due to electrical noise.

Still other detectors often include many electrical components which not only increase the cost of the detector but are often unnecessary. This is especially true when the detector is associated with a system that already includes a microcomputer based controller. In such systems, the microcomputer could often be used to further serve the function of much of the detector circuitry.

Therefore, it is an object of this invention to provide a phase reversal detector that includes a microcomputer instead of numerous discrete electrical components.

Another object is to provide a three-phase fault detector that detects and distinguishes among several faults including phase reversal, phase loss, and power loss.

Yet another object is to provide a fault detector whose response time to various faults is accurately and independently adjustable.

Still another object is to provide a three-phase fault detector having a sampling time that is accurately synchronized with the three-phase circuit by using an interrupt signal indirectly generated by the current in one of the three phases.

These and other objects of the invention will be apparent from the attached drawings and the description of the preferred embodiment which follow hereinbelow.

SUMMARY OF THE INVENTION

The fault detector generates three timing signals in response to and representative of the alternating current through each phase of a three-phase circuit. The fault detector also generates two interrupt signals, a first interrupt initiated by one of the pulsating signals and a backup interrupt generated by a microcomputer only when the first interrupt doesn't occur. The microcomputer is connected to receive the three timing signals and the interrupt signals. Upon receiving one of the interrupts, the microcomputer samples the timing signals and identifies any abnormal pattern of signals as those that deviate from a predetermined pattern. The microcomputer is further operative to identify a fault condition upon counting a predetermined number of occurrences of the abnormal patterns.

DESCRIPTION OF THE PREFERRED EMBODIMENT

Figure 1:
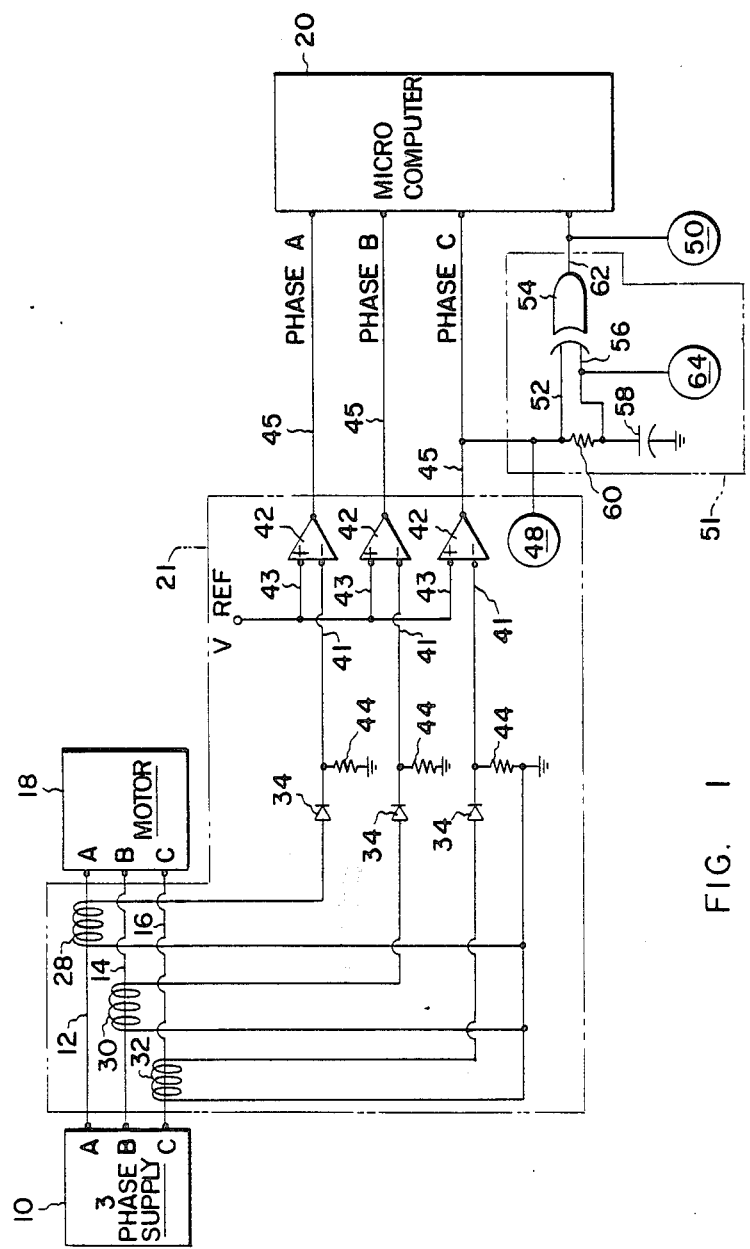
FIG. 1 is a circuit diagram of the subject invention.

FIG. 1 shows a three phase alternating current supply 10 providing electrical power through conductors 12, 14, and 16 to a three phase inductive motor 18. The three phases of supply 10 will be referred to hereinbelow as phase A, B, and C which correspond to conductors 12, 14, and 16 respectively. In the preferred embodiment, motor 18 is shown as an exemplary three-phase load because of its noticeable adverse reactions to power related faults such as phase reversal, phase loss, and power loss. It should be noted, however, that the subject invention can also be used with a wide variety of other three phase loads.

FIG. 1 also shows a microcomputer 20, such as an NEC 7508, connected to a circuit 21. Circuit 21 provides microcomputer 20 with input signals relating to the phase relationship of either the voltage or current at conductors 12, 14, and 16. With these input signals, microcomputer 20 not only determines the sequence in which the alternating voltage at each conductor 12, 14, and 16 leads or lags the others, but also identifies any improper sequence (improper phase rotation) as well as identifies any occurrences of phase or power loss. Circuit 21 represents any circuit that can sense an electrical parameter associated with conductors 12, 14, and 16, such as voltage, current, or phase, and provide information in the form of three pulsating signals which represent the phase relationship of the electrical parameter.

Figure 2:
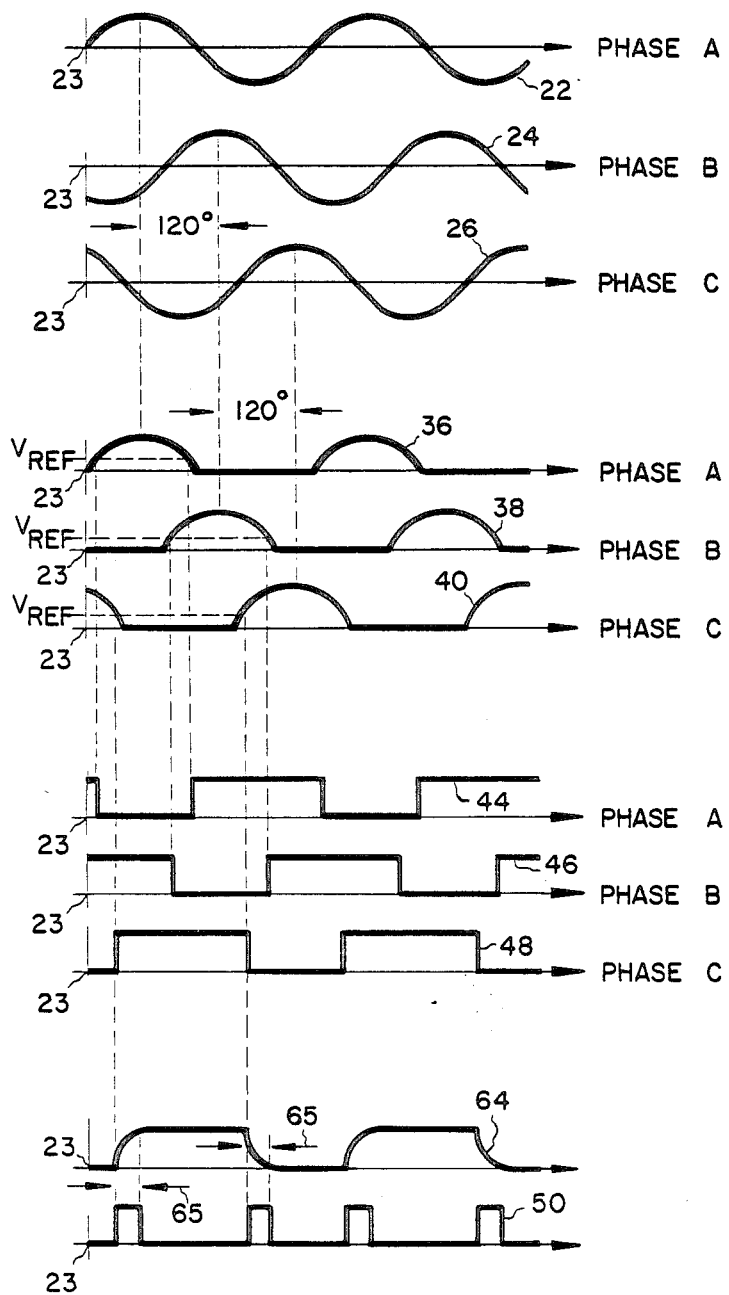
FIG. 2 illustrates electrical wave forms at various points on the circuit shown in FIG. 1.

Circuit 21 can be more clearly understood by referring to FIG. 2 which illustrates the wave forms and time relationships of several signals at various points in circuit 21. The wave forms of FIG. 2 are illustrated with voltage on the vertical axis and time on the horizontal axis. At the intersection of the two axes, denoted by numeral 23, both the voltage and time equal zero.

The first three signals 22, 24, and 26 represent the current through conductors 12, 14, and 16 respectively as sensed by current transformers 28, 30, and 32 functioning as phase sensors. Signals 22, 24, and 26 are shown during normal non-fault conditions with signal 24 lagging signal 22 by a phase angle of 120 degrees and with signal 26 lagging signal 24 also by 120 degrees.

Signals 22, 24, and 26 are half wave rectified by diodes 34 to produce signals 36, 38, and 40 which are supplied to an inverting input 41 of operational amplifiers 42. Resistors 44 clamp signals 36, 38, and 40 to ground potential during the negative half-cycle of signals 22, 24, and 26. A DC reference voltage ($V_{ref}$) is applied at a noninverting input 43 of operational amplifiers 42. $V_{ref}$ is selected to have a value that is less than the supply voltage (commonly referred to as $V_{cc}$) of operational amplifier 42 and is used as the threshold value at which signals 36, 38, and 40 drive amplifiers 42 to saturation.

As a result of input signals 36, 38, and 40 in conjunction with $V_{ref}$, signals 44, 46, and 48 are produced at output 45 of amplifiers 42. Signals 44, 46, and 48 are generated as square waves because the voltage at output 45 is high (approximately equal to $V_{cc}$, binary value of one) until the voltage at its inverting input 41 exceeds $V_{ref}$, at which time the voltage at output 45 is driven low (approximately zero volts, binary value of zero). The three square wave output signals 44, 46, and 48 represent phase A, B, and C respectively and are the pulsating digital timing signals whose binary values are repeatedly sampled by microcomputer 20. This sampled information is used by microcomputer 20 in determining reverse phase rotation as well as other faults of supply 10, such as phase or power loss. The binary values of signals 44, 46, and 48, as received by microcomputer 20 at one sampling, comprises one pattern of signals.

Microcomputer 20 samples a pattern of signals 44, 46, and 48 upon receiving an interrupt signal. The interrupt signal can either be a leading and/or falling edge of signal 44, 46, or 48, or, as in the preferred embodiment, can be the leading edge of signal 50 which is indirectly generated off signal 48 by circuit 51.

When circuit 51 is the means for producing interrupt signal 50, pulsating signal 48 is supplied directly to input 52 of an exclusive-OR gate 54. The other input 56 of gate 54 is connected through a capacitor 58 to ground and is also connected to inputs 52 through a resistor 60. Resistor 60 allows the voltage of signal 64 at input 56 to follow the voltage of signal 48 of input 52. But the value of capacitor 58 and resistor 60 are chosen such that their RC time constant retards the voltage rise and fall of signal 64. The output at point 62 is high during the rise and fall periods 65, but is otherwise low, as shown by the wave form of signal 50. In the preferred embodiment, microcomputer 20 is only interrupted at the leading edge of interrupt signal 50 which occurs at both the leading and falling edge of signal 48. With this circuit arrangement, interrupt 50 occurs at twice the frequency of any of the three pulsating signals 44, 46, and 48.

Figure 3:
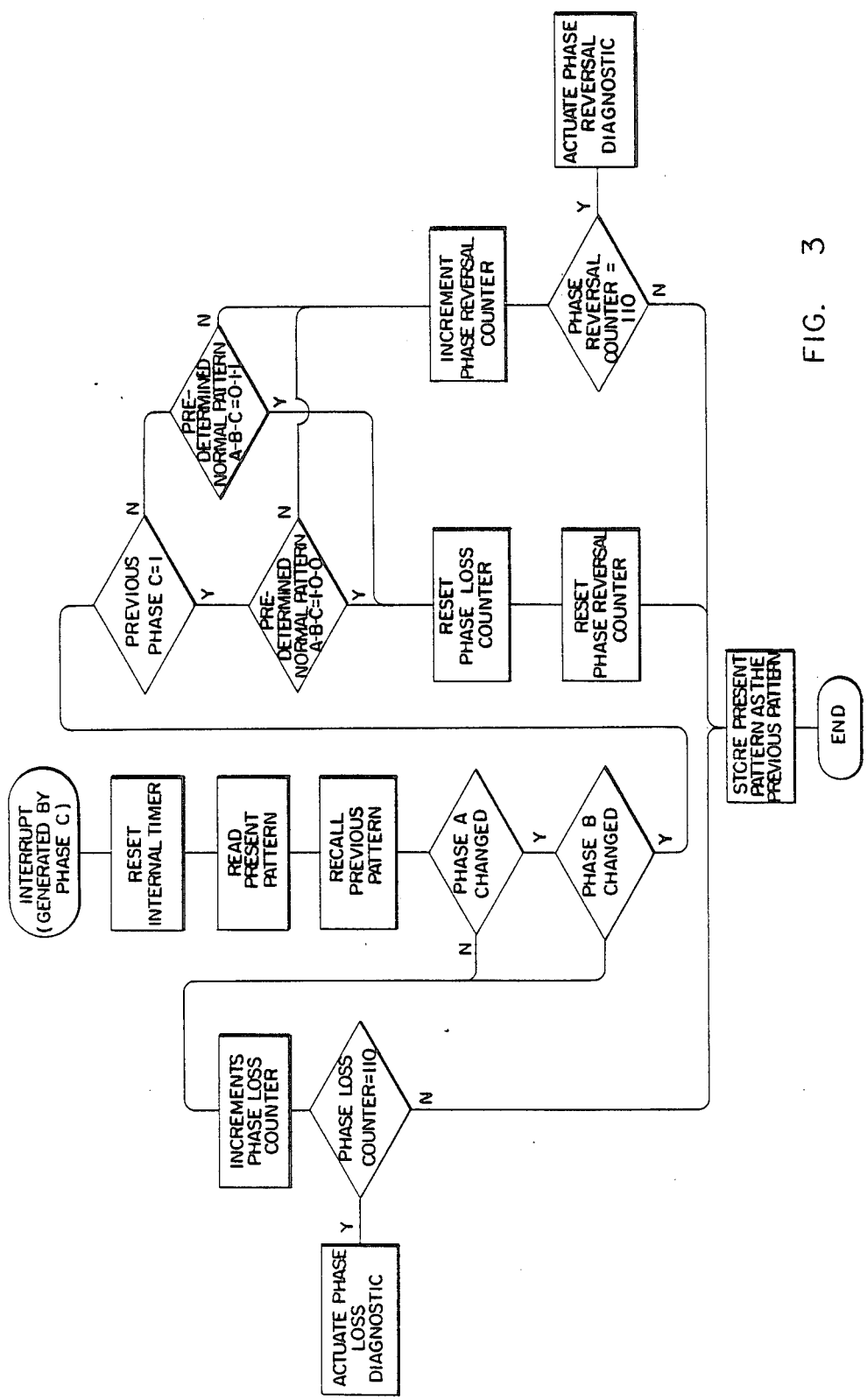
FIG. 3 is the logic sequence the microcomputer follows upon receiving an interrupt generated external to the microcomputer.

Upon detecting the leading edge of interrupt 50, microcomputer 20 follows the logic sequence summarized by the algorithm of FIG. 3. Under the control of this algorithm, microcomputer 20 verifies that the latest sampled phase readings of signals 44, 46, and 48 have all changed in binary value from their previous readings which had been stored in a memory associated with microcomputer 20. It is assumed that phase C (signal 48) has changed values, since it is the change in value of signal 48 that indirectly generates interrupt 50 which in turn initiates the algorithm. If the value of either phase A or B (signals 44 and 46 respectively) have not changed, a phase loss counter is incremented and the binary values of the latest pattern is stored in the memory for later comparison with the next sampled phase readings. Microcomputer 20 subsequently exits the algorithm until the next leading edge of interrupt 50 is received.

However, if all phase values have changed, microcomputer 20 assumes that all the phases are active and subsequently checks for a possible phase reversal, i.e., improper phase rotation. Microcomputer 20, under control of the algorithm of FIG. 3, identifies a phase reversal as any pattern of signals 44, 46, and 48 with phase A having a binary value equal to either that of phase B or C. Therefore, a normal pattern characteristic of proper phase rotation would have binary values of phase A, B, C respectively equal to 1, 0, 0 or 0, 1, 1. Phase B and C (signals 46 and 48 respectively) are the two preselected timing signals having sampled binary values that remain equal to each other at the time they are sampled by microcomputer 20. If phase A equals B or C, a phase reversal counter is incremented. However, if neither a phase loss nor a phase reversal have been detected, then their respective counters are reset to zero. Regardless of whether or not a phase reversal occurs, microcomputer 20 stores the latest phase value readings for comparison with the next readings and exits the algorithm until the next interrupt 50.

Also at the occurrence of interrupt 50, a continuously running timer, internal to microcomputer 20, is reset to zero. In the absence of interrupt 50, as caused by a power loss or just a loss of phase C, the microcomputer timer is free to time out and thereby function as a means for producing a second interrupt signal. As a result, the second interrupt signal occurs only when the first one does not.

Figure 4:
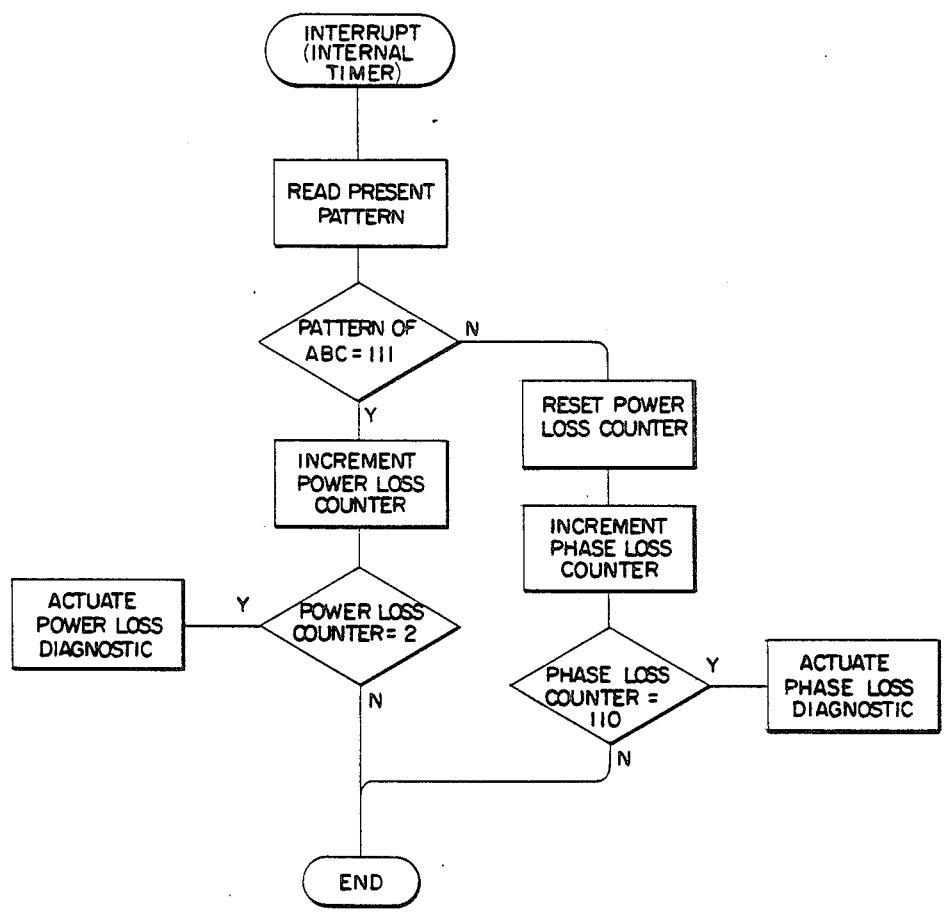
FIG. 4 is the logic sequence the microcomputer follows upon receiving an interrupt generated internal to the microcomputer.

The second interrupt is a pulsating signal internally generated by microcomputer 20 at approximately the same frequency as the first interrupt signal. The second interrupt directs microcomputer 20 to follow the logic steps of a second algorithm shown in FIG. 4. The second algorithm determines whether the absence of the first interrupt was caused by a power loss or just a loss of phase C. If none of the three phases are present, i.e., the binary values of signals 44, 46, and 48 all equal one, then microcomputer 20 increments a power loss counter, otherwise, the phase loss counter is incremented. The second algorithm repeats itself at the frequency of the second interrupt until either the first interrupt signal 50 reoccurs, at which time both the power and phase loss counters are reset to zero and control returns to the first algorithm, or until one of the counters reaches a predetermined count, at which time an appropriate diagnostic is actuated.

It should be noted that the predetermined count associated with each of the counters are preselected values which can be changed to vary the response time taken to identify a fault. The response time is more critical for a momentary power loss than for other faults and therefore, in the preferred embodiment, their predetermined counts have been preset at 2 and 110 respectively.

Although the invention is described with respect to a preferred embodiment, modifications thereto will become apparent to those skilled in the art. Therefore, the scope of the invention is to be determined by reference to the claims which follow.

We claim:

1. A fault detector for a three-phase alternating current supply having three supply phases comprising:
    a. means for producing three binary timing signals representing the phase relationship of the voltage or current of the three supply phases;
    b. means for producing a first interrupt signal initiated by one of the three supply phases; and
    c. a microcomputer connected to receive the three timing signals and the interrupt signal, wherein upon receiving the interrupt signal, said microcomputer samples the binary timing signals and identifies abnormal patterns of signals as any patterns that deviate from a predetermined normal pattern.

2. The fault detector as recited in claim 1, wherein said microcomputer identifies a phase reversal fault upon counting a predetermined number of occurrences of said abnormal pattern.

3. The fault detector as recited in claim 1, wherein said predetermined pattern is determined based on a previously sampled pattern of timing signals.

4. The fault detector as recited in claim 3, wherein said normal pattern is characterized by timing signals that have all changed in binary value from the previously sampled pattern and include only two preselected timing signals having sampled binary values that remain equal to each other at the time they are sampled.

5. The fault detector as recited in claim 1, wherein said microcomputer is further operative to identify and distinguish among three different abnormal signal patterns predetermined to be associated with any one of a phase reversal fault, phase loss fault, and power loss fault.

6. The fault detector as recited in claim 1, wherein said first interrupt signal occurs at an integer multiple of the frequency of the voltage in said one of the three supply phases.

7. The fault detector as recited in claim 1, further comprising a second interrupt signal that is allowed to occur when said first interrupt signal is not received by the microcomputer within a predetermined time period.

8. The fault detector as recited in claim 7, wherein said second interrupt signal occurs at approximately twice the frequency of the voltage in any of the three supply phases.

9. The fault detector as recited in claim 1, wherein said means for producing three binary timing signals include a plurality of current transformers that sense the current in each of the three supply phases.

10. A fault detector for a three-phase alternating current supply having three supply phases comprising:
    a. means for producing three binary timing signals representing the phase relationship of the voltage of the three supply phases;
    b. means for producing a first interrupt signal initiated by one of the three supply phases;
    c. means for producing a second interrupt signal if said first interrupt does not occur within a predetermined time period; and
    d. a microprocessor connected to receive the three timing signals and the two interrupt signals, wherein upon receiving one of the interrupt signals, said microcomputer samples the binary timing signals and by comparing them to a predetermined normal pattern, identifies abnormal signal patterns that are associated with any one of a phase reversal fault, a phase loss fault, and a power loss fault.

11. The fault detector as recited in claim 10, wherein said microcomputer identifies any one of the faults upon counting a predetermined number of occurrences of the abnormal pattern associated with its respective fault.

12. The fault detector as recited claim 10, wherein said predetermined pattern is based on a previously sampled pattern of timing signals.

13. The fault detector as recited in claim 12, wherein said normal pattern is characterized by timing signals that have all changed in binary value from the previously sampled pattern and include only two preselected timing signals having sampled binary values that remain equal to each other at the time they are sampled.

14. The fault detector as recited in claim 10, wherein both of said interrupt signals occur at approximatley an integer multiple of the frequency of the alternating voltage in any of the three supply phases.

15. The fault detector as recited in claim 10, wherein said means for producing three binary timing signals include a plurality of current transformers that sense the current in each of the three supply phases.

* * * * *